United States Patent
Nishio et al.

(10) Patent No.: US 7,725,074 B2
(45) Date of Patent: May 25, 2010

(54) WIRELESS COMMUNICATION METHOD, RELAY STATION APPARATUS, AND WIRELESS TRANSMITTING APPARATUS

(75) Inventors: Akihiko Nishio, Kanagawa (JP); Yasuaki Yuda, Kanagawa (JP); Tomohiro Imai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 359 days.

(21) Appl. No.: 11/816,620

(22) PCT Filed: Feb. 16, 2006

(86) PCT No.: PCT/JP2006/302766

§ 371 (c)(1),
(2), (4) Date: Dec. 10, 2007

(87) PCT Pub. No.: WO2006/088105

PCT Pub. Date: Aug. 24, 2006

(65) Prior Publication Data

US 2009/0011700 A1    Jan. 8, 2009

(30) Foreign Application Priority Data

Feb. 18, 2005   (JP) .............................. 2005-042264

(51) Int. Cl.
*H04B 7/14*     (2006.01)
*H04B 3/36*     (2006.01)

(52) U.S. Cl. ........................ 455/7; 455/422.1; 455/13.1; 455/452.1

(58) Field of Classification Search .............. 455/422.1, 455/426.1, 450, 452.1, 434, 458, 11.1, 7, 455/13.1, 9, 15, 515, 509, 517, 553.1, 126; 375/347, 316; 370/208, 328, 315

See application file for complete search history.

(56) References Cited

U.S. PATENT DOCUMENTS 5,884,171 A * 3/1999 Tanabe et al. ............... 455/434

(Continued)

FOREIGN PATENT DOCUMENTS

JP    2000022615    *  1/2000

(Continued)

OTHER PUBLICATIONS

PCT International Search Report dated Mar. 14, 2006.*

(Continued)

*Primary Examiner*—John Lee
(74) *Attorney, Agent, or Firm*—Dickinson Wright PLLC

(57) ABSTRACT

A wireless communication method and the like for improving the system throughput. The wireless communication method is used in a mobile communication system having a base station apparatus (BS), a relay station apparatus (RS) (100) and a mobile station apparatus (MS) #1. In a first transmission step, a first transport signal, which includes data addressed to MS #1, is transmitted from BS to RS (100). In a second transmission step, a second transport signal, which includes a pilot generated by BS, is transmitted from BS. Simultaneously, in the second transmission step, a relay signal, which includes the data addressed to MS #1 and also includes a pilot that is generated by RS (100) and that has a particular orthogonal relationship with the pilot generated by BS, is transmitted from RS (100) to MS #1.

15 Claims, 9 Drawing Sheets

U.S. PATENT DOCUMENTS

2002/0126780 A1 * 9/2002 Oshima et al. ............... 375/347
2005/0118993 A1 * 6/2005 Roux et al. ................. 455/423
2005/0174929 A1 * 8/2005 Hayashi et al.
2007/0254693 A1 * 11/2007 Furukawa ................ 455/553.1

FOREIGN PATENT DOCUMENTS

| JP | 2002064464 | * | 2/2002 |
| JP | 2002330112 | * | 11/2002 |
| JP | 2003174392 | * | 6/2003 |
| JP | 2003283441 | * | 10/2003 |
| JP | 2004328286 | * | 11/2004 |
| WO | 03098853 | * | 11/2003 |

OTHER PUBLICATIONS

Y. Kishiyama, et al.: "Investigation of Pilot Channel Structure for VSF-OFCDM," Technical Report of IEICE, RCS2002-169, Oct. 2002, pp. 19-24.*

* cited by examiner

WIRELESS COMMUNICATION METHOD, RELAY STATION APPARATUS, AND WIRELESS TRANSMITTING APPARATUS

TECHNICAL FIELD

The present invention relates to a radio communication method, a relay station apparatus and a radio transmitting apparatus used in a radio communication system where an apparatus for relaying a radio signal from a transmitting apparatus to a receiving apparatus is provided.

BACKGROUND ART

In recent years, there has been active study of technical approaches for achieving a high transmission rate using a high-frequency radio band in cellular mobile communication systems typified by mobile telephones (see Non-Patent Document 1, for example). An example of such study relates to MIMO (Multiple Input Multiple Output) transmission and the like in which a plurality of data sequences are transmitted from a plurality of transmitting antennas, and signals received using a plurality of receiving antennas are separated into data sequences and decoded.

However, when a high-frequency radio band is used, attenuation due to transmission distance increases compared to the case where a low-frequency radio band is used, and the rectilinear property of the radio waves becomes more significant. In other words, radio waves that pass around buildings and other obstacles are weakened, and therefore the areas where the high transmission rate can be expected are limited to relatively short distances. There must therefore be more base station apparatuses provided within the system. Providing base station apparatuses costs corresponding money, and there is therefore a significant need for a technique that realizes a high transmission rate while suppressing an increase in the number of base station apparatuses to be provided.

In an example of a conventional mobile communication system, the coverage area of a base station apparatus is substantially enlarged by using a relay station apparatus for relaying a radio signal from a transmitting apparatus to a receiving apparatus (see Patent Document 1, for example).

Patent Document 1: Japanese Patent Application Laid-Open No. 2002-330112

Non-patent Document 1: "Investigation of Pilot Channel Structure for VSF-OFCDM Broadband Wireless Access," The Technical Report of the IEICE of Japan, RCS2002-169 (2002-10).

DISCLOSURE OF INVENTION

Problems to Be Solved by the Invention

However, in the above-described conventional mobile communication system, the radio signal relayed by the relay station apparatus may become an interference signal to other radio signals. For example, in downlink, a radio signal transmitted by the relay station apparatus to a specific mobile station apparatus may interfere with another mobile station apparatus which directly communicates with the base station apparatus near the relay station apparatus. In this case, error rate characteristics of the mobile station apparatus which directly communicates with the base station apparatus deteriorate, and the system throughput decreases.

It is therefore an object of the present invention to provide a radio communication method, a relay station apparatus and a radio transmitting apparatus capable of improving the system throughput.

Means for Solving the Problem

The radio communication method of the present invention is used in a radio communication system including a transmitting apparatus, a relay station apparatus and a receiving apparatus, and the radio communication method has: a first transmission step of transmitting, from the transmitting apparatus to the relay station apparatus in a first transmission period, a first transmission signal that includes a signal addressed to the receiving apparatus; and a second transmission step of transmitting, from the transmitting apparatus in a second transmission period subsequent to the first transmission period, a second transmission signal that includes a first known signal, and simultaneously transmitting from the relay station apparatus a third transmission signal that includes the signal addressed to the receiving apparatus included in the first transmission signal, the third transmission signal further including a second known signal that has a specific orthogonal relationship with the first known signal.

The relay station apparatus of the present invention has: a receiving section that receives a first transmission signal from a transmitting apparatus that transmits, in a first transmission period, a first transmission signal in which a first known signal is added to a signal addressed to a receiving apparatus, and transmits, in a second transmission period subsequent to the first transmission period, a second transmission signal that includes the first known signal; a substituting section that substitutes a second known signal having a specific orthogonal relationship with the first known signal for the first known signal in the first transmission signal, and generates a third transmission signal; and a transmitting section that transmits the third transmission signal to the receiving apparatus in the second transmission period.

The radio transmitting apparatus of the present invention has an adding section that adds a first known signal to a signal addressed to a receiving apparatus to generate a first transmission signal, and generates a second transmission signal that includes a second known signal having a specific orthogonal relationship with the first known signal; and a transmitting section that transmits the first transmission signal in a first transmission period, and transmits the second transmission signal in a second transmission period to a relay station apparatus that transmits the first transmission signal to the receiving apparatus in the second transmission period subsequent to the first transmission period.

ADVANTAGEOUS EFFECT OF THE INVENTION

According to the present invention, it is possible to improve the system throughput.

BEST MODE FOR CARRYING OUT THE INVENTION

Embodiments of the present invention will be described in detail below with reference to the accompanying drawings.

Embodiment 1

Figure 1:
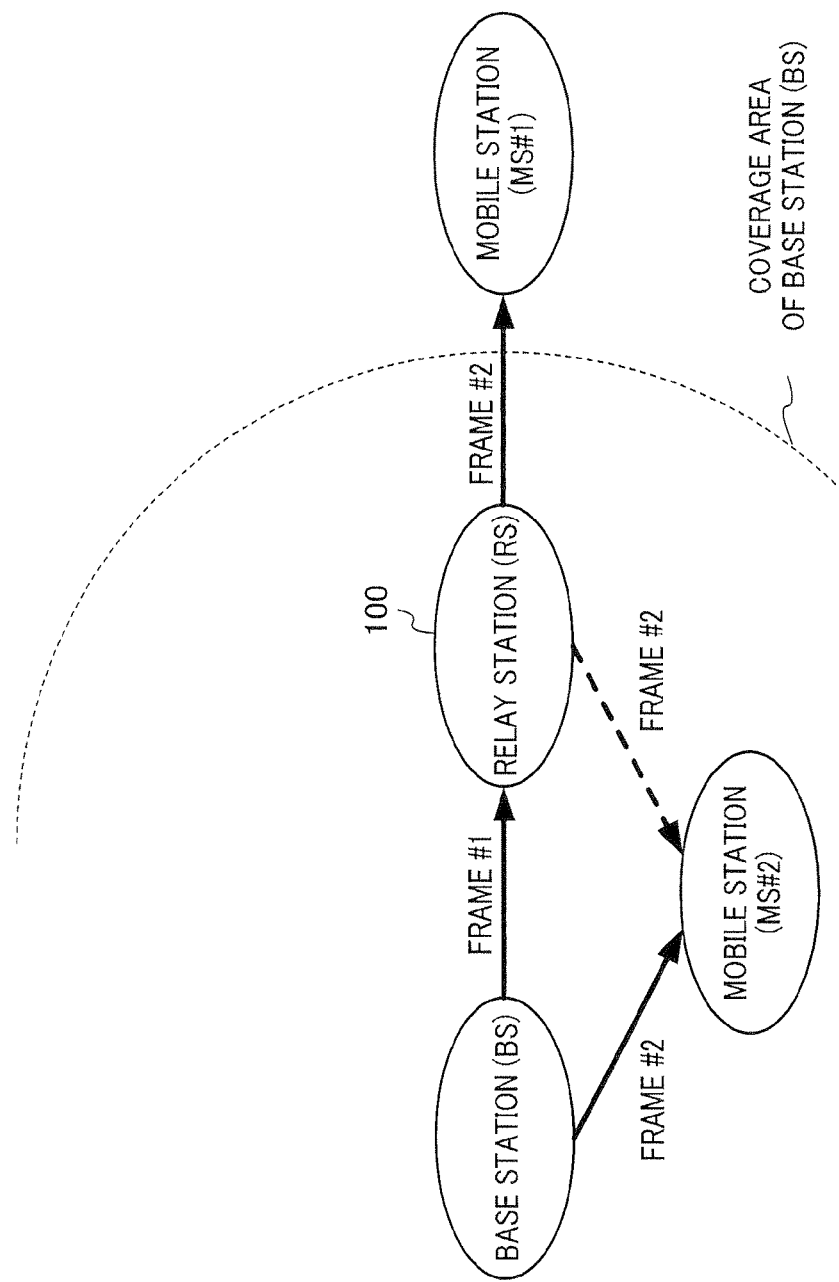
FIG. 1 shows a configuration of a mobile communication system according to Embodiment 1 of the present invention.

FIG. 1 shows a configuration of the mobile communication system provided with a relay station apparatus according to Embodiment 1 of the present invention. The mobile communication system shown in FIG. 1 has relay station apparatus (hereinafter referred to as "RS") 100, a base station apparatus ("BS" hereinafter) as a radio transmitting apparatus, and two mobile station apparatuses ("MS#1" and "MS#2" hereinafter) as radio receiving apparatuses. For convenience, in this embodiment, the numbers of relay stations and mobile stations are one and two, respectively, but the numbers of relay stations and mobile stations are not limited to these numbers.

BS, RS100, MS#1 and MS#2 perform transmission and reception in synchronization with each other using a frame having a predetermined time length (0.5 ms, for example) as a unit. BS transmits data addressed to MS#1 in frame #1, and transmits data addressed to MS#2 in frame #2, which is a frame subsequent to frame #1. The same pilot signal (hereinafter referred to as "pilot") is added through time multiplexing to the data to be transmitted to MS#1 and the data to be transmitted to MS#2. The data addressed to MS#1 to which the pilot is added will be referred to herein after as a "first transmission signal", and the data addressed to MS#2 to which the pilot is added will be referred to as a "second transmission signal". The pilot added to each data by BS is generated using an orthogonal sequence such as a Walsh sequence, for example.

MS#2 is located within the coverage area of BS, and therefore the second transmission signal is directly transmitted to MS#2. The destination address of the second transmission signal can be another RS when MS#2 is located outside the coverage area of BS.

MS#1 is located outside the coverage area of BS, and therefore the first transmission signal is therefore transmitted to RS100. RS100 relays the data addressed to MS#1. Specifically, a relay signal is generated from the first transmission signal received from BS and transmitted to MS#1 in frame #2. At this time, the relay signal becomes an interference signal for MS#2 which receives the second transmission signal in frame #2.

Both MS#1 and MS#2 are receivers that implement a reception method that is capable of removing interference, such as MIMO reception, MMSE (Minimum Mean Square Error) diversity reception and MMSE symbol combining reception, for example. When MS#1 and MS#2 are provided with a MIMO receiver, BS transmits only a single stream in frame #2 in which RS100 performs transmission. The details of the operation of the overall system will be described later.

Figure 2:
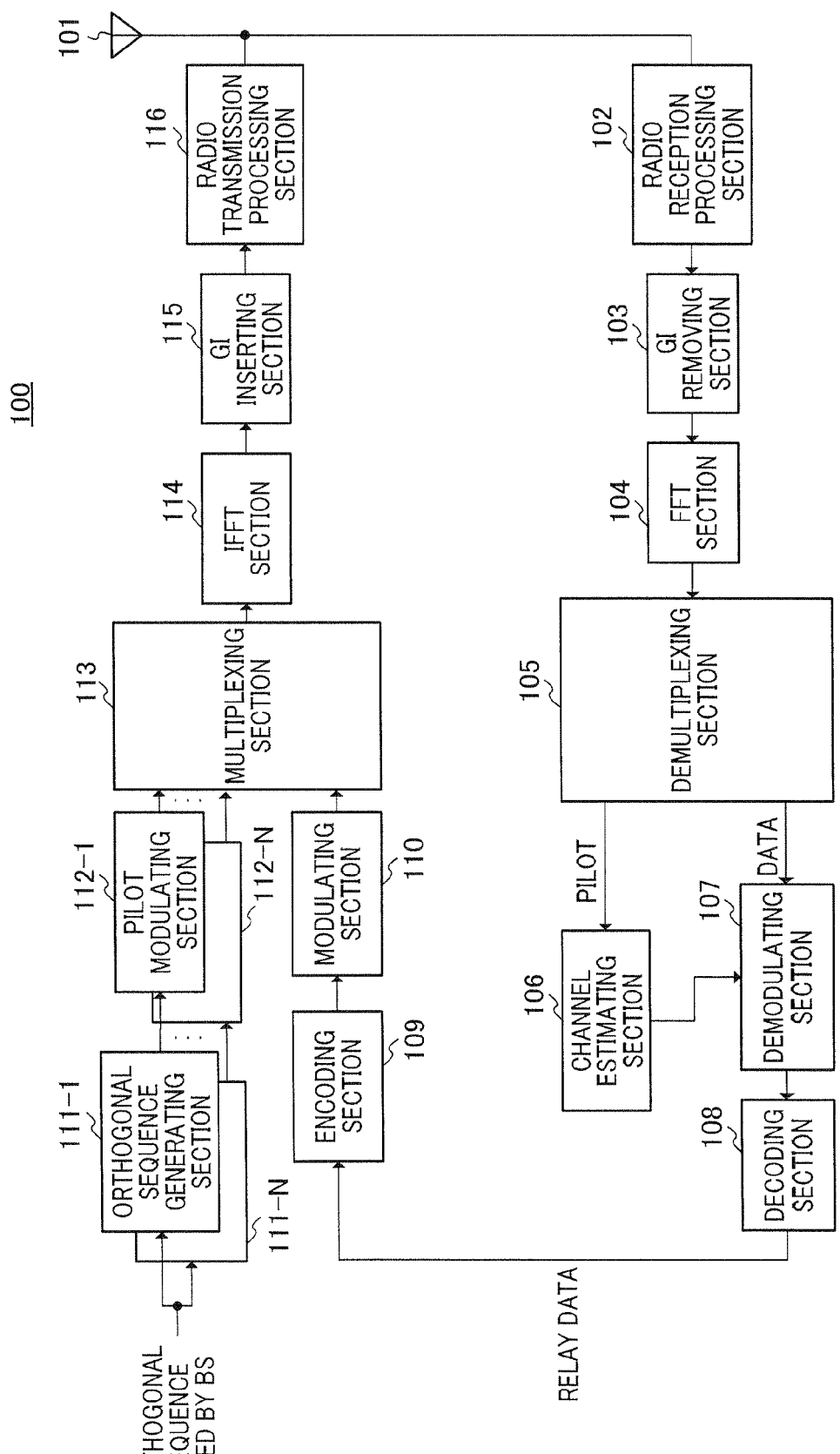
FIG. 2 is a block diagram showing a configuration of a relay station apparatus according to Embodiment 1 of the present invention.

As shown in FIG. 2, RS100 has antenna 101, radio reception processing section 102, GI (Guard Interval) removing section 103, FFT (Fast Fourier Transform) section 104, demultiplexing section 105, channel estimating section 106, demodulating section 107, decoding section 108, encoding section 109, modulating section 110, orthogonal sequence generating sections 111-1 through 111-N (where N is an integer equal to or greater than 2), pilot modulating sections 112-1 through 112-N, multiplexing section 113, IFFT (Inverse Fast Fourier Transform) section 114, GI inserting section 115 and radio transmission processing section 116.

Radio reception processing section 102 receives the first transmission signal transmitted from BS via antenna 101, and performs predetermined radio reception processing (such as down-conversion and A/D conversion, for example) on the received first transmission signal. After the radio reception processing, the first transmission signal is outputted to GI removing section 103. GI removing section 103 removes a GI that is inserted in a predetermined position of the first transmission signal after radio reception processing. FFT section 104 performs FFT processing on the first transmission signal after GI removal. The first transmission signal after FFT processing is outputted to demultiplexing section 105.

Demultiplexing section 105 demultiplexes the first transmission signal inputted from FFT section 104 into a pilot and data addressed to MS#1. The demultiplexed pilot is outputted to channel estimating section 106, and the demultiplexed data addressed to MS#1 is outputted to demodulating section 107.

Channel estimating section 106 performs channel estimation using the pilot inputted from demultiplexing section 105 and obtains a channel estimation value. Demodulating section 107 performs channel compensation based on the channel estimation value obtained by channel estimating section 106 and demodulates the data addressed to MS#1 inputted from demultiplexing section 105. Decoding section 108 decodes the data which is addressed to MS#1 and demodulated by demodulating section 107.

Accordingly, the data addressed to MS#1 in the state before encoded by BS is reproduced in RS. In other words, RS100 according to this embodiment is a relay station apparatus that employs a reproduction relay scheme that reproduces the data upon relay of the data.

Encoding section 109 encodes the data which is addressed to MS#1 and decoded by decoding section 108. Modulating section 110 modulates the data which is addressed to MS#1 and encoded by encoding section 109. The modulated data addressed to MS#1 is outputted to multiplexing section 113.

Orthogonal sequence generating sections 111-1 through 111-N correspond to N subbands, respectively, which are obtained by dividing the entire communication band into N parts. An orthogonal sequence (orthogonal sequence used by BS) used by BS is inputted to orthogonal sequence generating sections 111-1 through 111-N. Orthogonal sequence generating sections 111-1 through 111-N each generate a sequence that has a specific orthogonal relationship with the orthogonal sequence used by BS. For example, orthogonal sequence generating sections 111-1 through 111-N each generate a sequence that is orthogonal to the orthogonal sequence used by BS, such as a Walsh sequence.

The sequences generated by orthogonal sequence generating sections 111-1 through 111-N are inputted to pilot modulating sections 112-1 through 112-N, respectively. Pilot modulating sections 112-1 through 112-N perform BPSK (Binary Phase Shift Keying) modulation on the inputted sequences, and thereby generate pilots that are orthogonal to the pilots added to the data by BS. The generated pilots are outputted to multiplexing section 113.

Specifically, the configuration composed of the combination of orthogonal sequence generating sections 111-1 through 111-N and pilot modulating sections 112-1 through 112-N functions as a pilot generating section that generates pilots.

Multiplexing section 113 multiplexes the data addressed to MS#1 inputted from modulating section 110, and the pilots inputted from pilot modulating sections 112-1 through 112-N, and generates a relay signal. In other words, multiplexing section 113 functions as a substituting section that substitutes for the pilots added to the data addressed to MS#1, pilots that are orthogonal to the pilots. Time multiplexing is used as the method for multiplexing the data with the pilots, but frequency multiplexing, code multiplexing, and other multiplexing methods may also be used.

IFFT section 114 performs IFFT processing on the relay signal generated by multiplexing section 113. GI inserting section 115 inserts a GI in a predetermined position of the relay signal after IFFT processing. Radio transmission processing section 116 performs predetermined radio transmission processing (such as D/A conversion and up-conversion, for example) on the relay signal after GI insertion. The relay signal after radio transmission processing is then transmitted from antenna 101 to MS#1.

Figure 3:
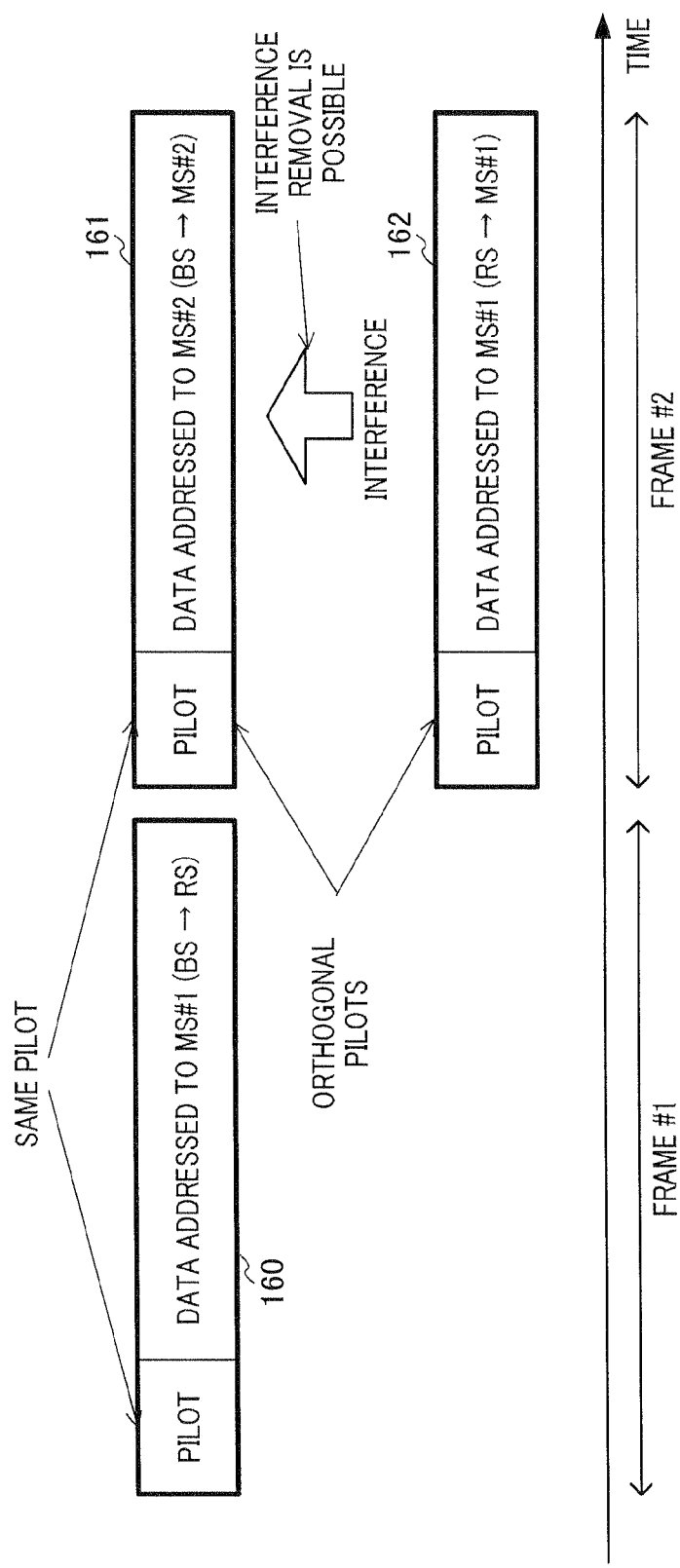
FIG. 3 illustrates an example of an operation of a mobile communication system according to Embodiment 1 of the present invention.

An example of the operation in the mobile communication system having the above configuration will next be described with reference to FIG. 3.

First, in frame #1, first transmission signal 160 is transmitted from BS to RS100.

In frame #2, second transmission signal 161 is transmitted from BS to MS#2. The pilot added to the data addressed to MS#2 in second transmission signal 161 is the same as the pilot added to the data addressed to MS#1 in first transmission signal 160.

In frame #2, relay signal 162 is transmitted from RS100 to MS#1. At this time, relay signal 162 transmitted from RS100 reaches MS#2 as an interference signal. However, the pilot added to the data addressed to MS#1 in relay signal 162 is orthogonal to the pilot added to the data addressed to MS#2 in second transmission signal 161. Therefore, MS#2 can remove the relay signal that arrives as an interference signal from the received radio signal using a reception method that is capable of removing interference, such as MIMO reception, MMSE diversity reception and MMSE symbol combining reception, and can extract only second transmission signal 161 transmitted from BS as a desired signal. However, the pilot added in the relay signal is reported in advance to MS#2.

The pilots generated by RS100 will be described using FIG. 4.

Figure 4:
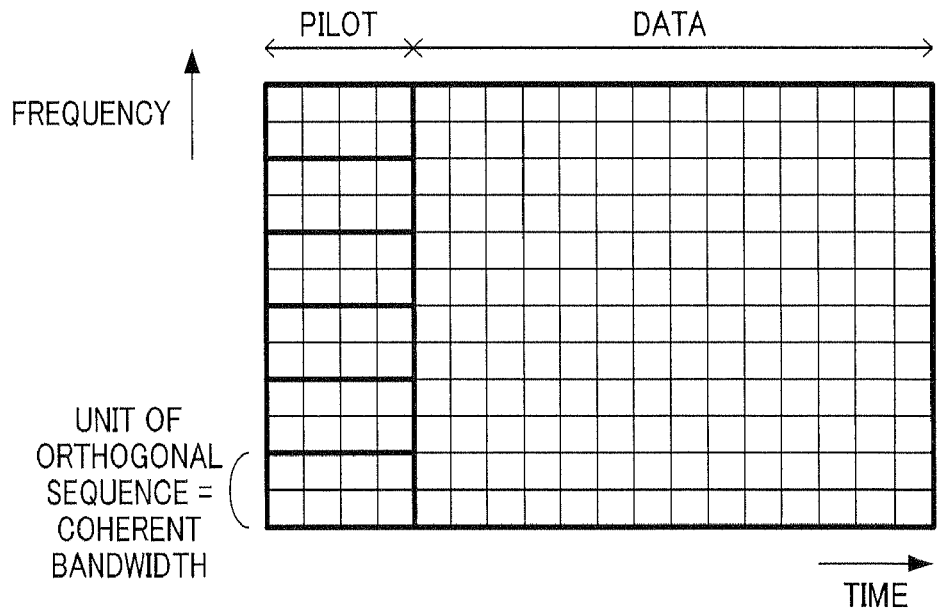
FIG. 4 shows an example of a pilot signal according to Embodiment 1 of the present invention.

The pilots shown in FIG. 4 are generated by performing BPSK modulation on the orthogonal sequence such as a Walsh sequence. By using an orthogonal sequence to generate a pilot, it is possible to generate an orthogonal pilot without reducing the transmission power of the pilot.

In the case of multicarrier transmission such as OFDM (Orthogonal Frequency Division Multiplexing), channel characteristics are different for each frequency due to influence of frequency-selective fading. Therefore, when a single orthogonal sequence is used for a wide band, the orthogonality deteriorates upon reception. As shown in FIG. 4, the pilots are made orthogonal within subbands in this embodiment. In other words, an orthogonal sequence is used for each pilot symbol in a subband. By this means, it is possible to prevent deterioration of the orthogonality of the pilots even under a frequency-selective fading environment. In the example shown in FIG. 4, an orthogonal sequence having a sequence length of "8" is used for each 8 symbols. In order to more reliably prevent the deterioration of the orthogonality, the bandwidth of the subbands is set to a coherent bandwidth in the mobile communication system, that is, a bandwidth for which channels are regarded as the same.

The pilots generated by RS100 are not limited to those shown in FIG. 4.

Figure 5:
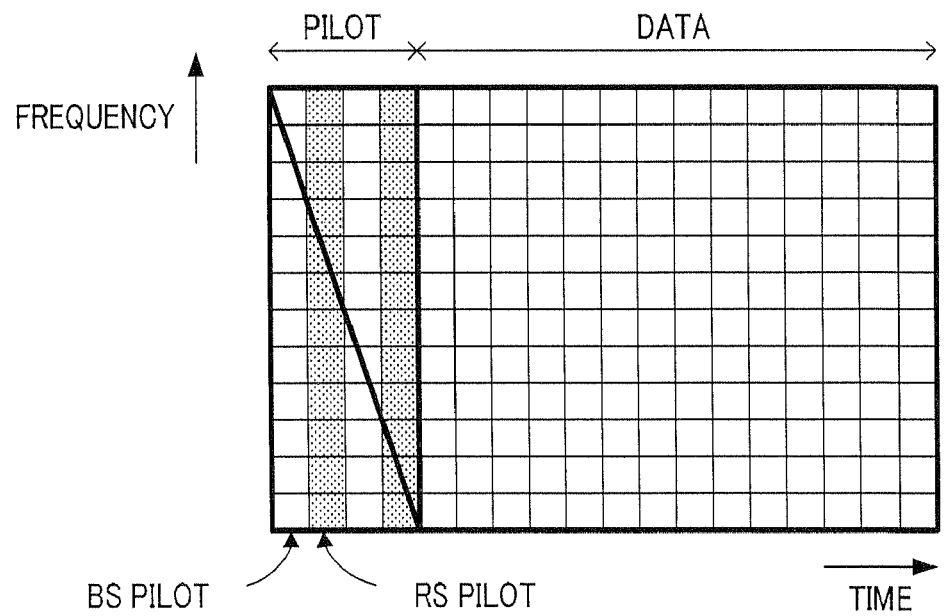
FIG. 5 shows another example of the pilot signal according to Embodiment 1 of the present invention.

For example, pilot generating sections of BS and RS100 each generate a pilot so that the pilot of BS and the pilot of RS100 are allocated to different times, that is, transmission timings, as shown in FIG. 5. In this case, it is possible to prevent deterioration of the orthogonality of the pilots in a situation where there is extremely severe fluctuation in the channel characteristics over time.

Figure 6:
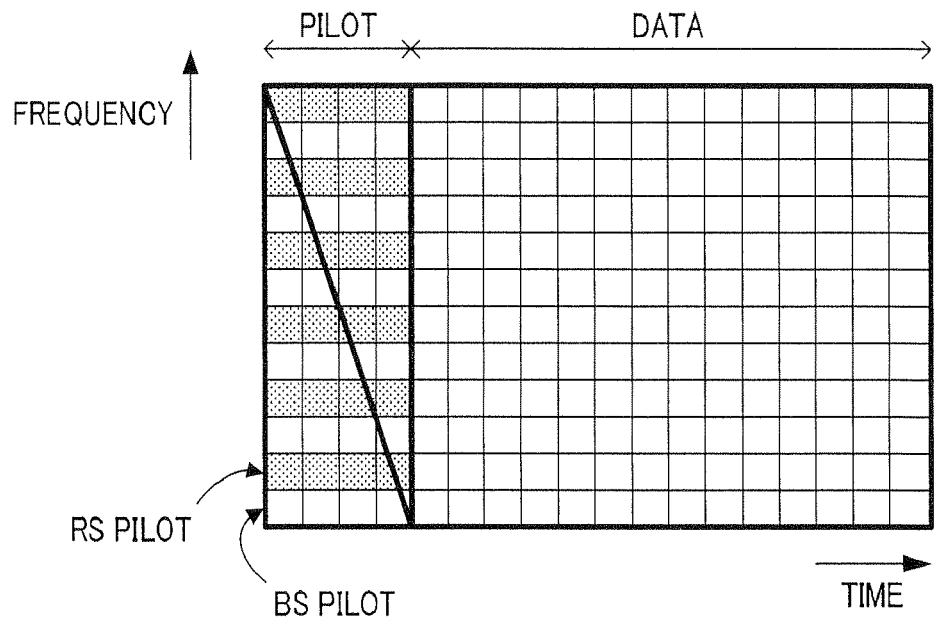
FIG. 6 shows another example of the pilot signal according to Embodiment 1 of the present invention.

Alternatively, pilot generating sections of BS and RS100 may each generate a pilot so that the pilot of BS and the pilot of RS100 are also allocated to different frequencies, as shown in FIG. 6. In this case, it is possible to prevent deterioration of the orthogonality of the pilots in the channel having large delay spread, that is, in a situation where the channel characteristics are significantly different for each frequency.

Figure 7:
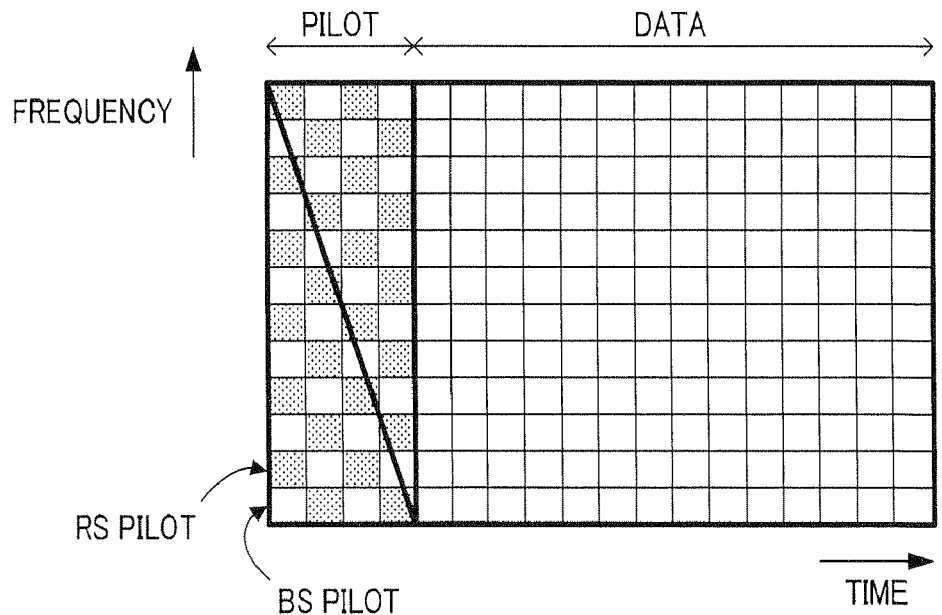
FIG. 7 shows another example of the pilot signal according to Embodiment 1 of the present invention.

Alternatively, pilot generating sections of BS and RS100 may each generate a pilot so that the pilot of BS and the pilot of RS100 are also allocated not only to different times, but also to different frequencies, as shown in FIG. 7. In this case, it is possible to prevent deterioration of the orthogonality of the pilots in a situation where there is extremely severe fluctuation in the channel characteristics over time and the channel characteristics are different for each frequency.

According to the present invention, the relay signal can be removed by MS#2, so that it is possible to improve a reception error rate of MS#2, and improve the overall system throughput.

Interference can also be removed using a MIMO receiver, which is assumed to be used in a future high-transmission-rate mobile communication system, so that it is possible to improve throughput without adding a complicated receiving circuit to the mobile station apparatus.

In addition, in this embodiment, the case has been described assuming radio communication in downlink. However, the present invention can be applied to uplink communication.

RS100 may also be provided to BS which is different from the above-described BS, or to MS which is different from the above-described MS#1 and MS#2.

The frame in which RS100 performs transmission has been described as frame #2 which follows frame #1, but the frame in which RS100 performs transmission does not necessarily follow frame #1, and may be a frame subsequent to frame #2, for example, frame #3, when a processing delay in RS100 is taken into consideration. In this case, RS100 transmits a pilot that is orthogonal to the pilot of BS transmitted in frame #3.

Further, the case has been described where OFDM is used as a transmission scheme, but this is by no means limiting, and other transmission schemes such as single-carrier transmission, CDMA, TDMA and FDMA may also be used.

The configuration has been described where RS100 relays data after performing demodulating and decoding processing on the first transmission signal, but a signal before decoding or a signal before demodulation may be relayed, for example.

In this embodiment, only the pilot part in the signal transmitted from each apparatus is made orthogonal, but a configuration may also be employed where the data part is also made orthogonal.

Embodiment 2

Figure 8:
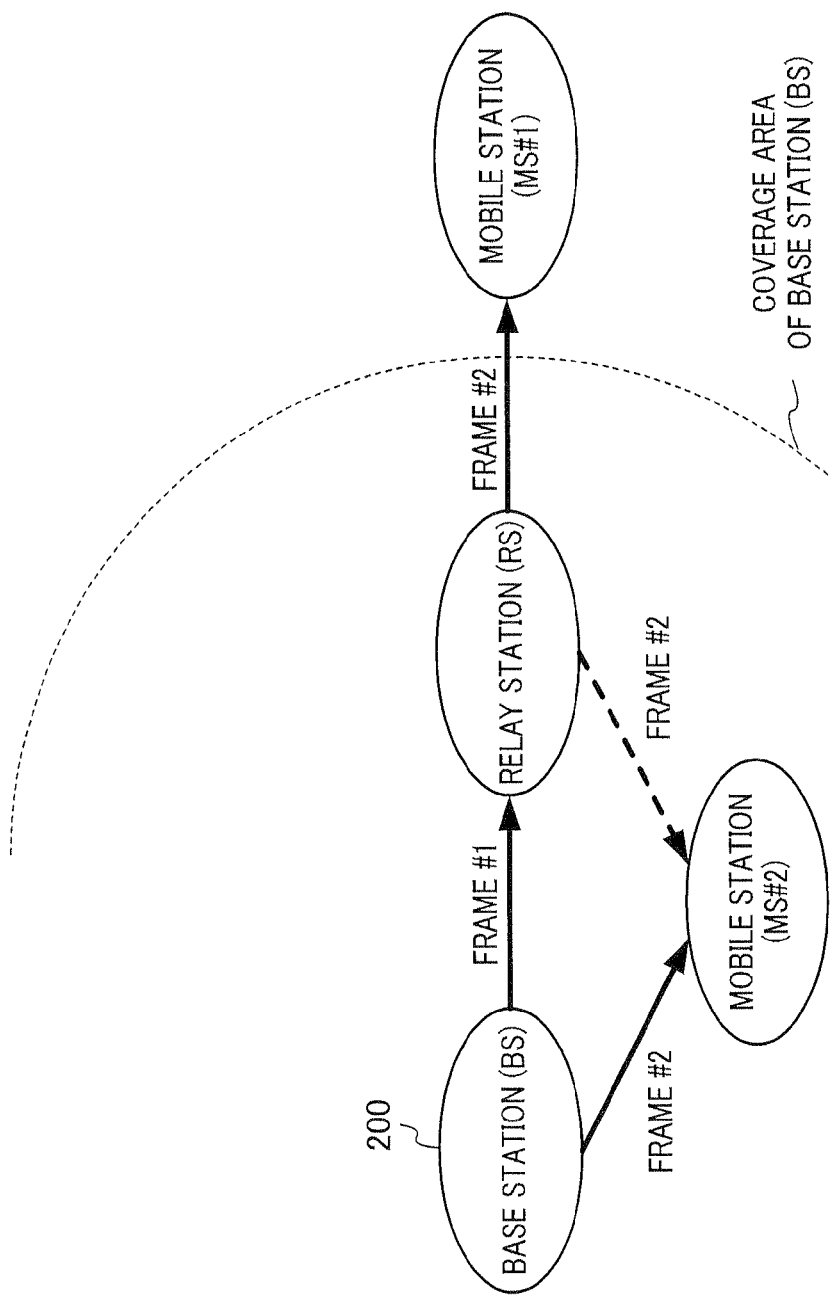
FIG. 8 shows a configuration of a mobile communication system according to Embodiment 2 of the present invention.

FIG. 8 is a block diagram showing a configuration of a mobile communication system provided with BS according to Embodiment 2 of the present invention. The mobile communication system shown in FIG. 8 has RS and BS200 as radio transmitting apparatuses, and MS#1 and MS#2 as radio receiving apparatuses. For convenience, in this embodiment, the numbers of relay stations and mobile stations are one and two, respectively, but the numbers of relay stations and mobile stations are not limited to these numbers.

BS200, RS, MS#1 and MS#2 perform transmission and reception in synchronization with each other, in the same way as in Embodiment 1. BS200 transmits data addressed to MS#1 in frame #1, and transmits data addressed to MS#2 in frame #2. Different pilots are added through time multiplexing to the data to be transmitted to MS#1 and the data to be transmitted to MS#2. The data addressed to MS#1 to which a pilot is added will be referred to hereinafter as a "first transmission signal", and the data addressed to MS#2 to which a pilot is added will be referred to as a "second transmission signal". The pilot added to each data by BS200 is generated using an orthogonal sequence such as a Walsh sequence, for example.

MS#2 is located within the coverage area of BS200, the second transmission signal is directly transmitted to MS#2. The destination address of the second transmission signal can be another RS when MS#2 is located outside the coverage area of BS200.

MS#1 is located outside the coverage area of BS200, and the first transmission signal is therefore transmitted to RS. RS relays the data addressed to MS#1. Specifically, a relay signal is generated from the first transmission signal received from BS and transmitted to MS#1 in frame #2. At this time, the relay signal is an interference signal for MS#2 which receives the second transmission signal in frame #2. RS in this embodiment is different from RS100 described in Embodiment 1, and transmits the same pilot as the pilot added by BS200 without substituting the pilot.

Both MS#1 and MS#2 are receivers that implement a reception method that is capable of removing interference, such as MIMO reception, MMSE diversity reception and MMSE symbol combining reception, for example. When MS#1 and MS#2 are provided with a MIMO receiver, BS200 transmits only a single stream in frame #2 in which RS performs transmission. The details of the operation of the overall system will be described later.

Figure 9:
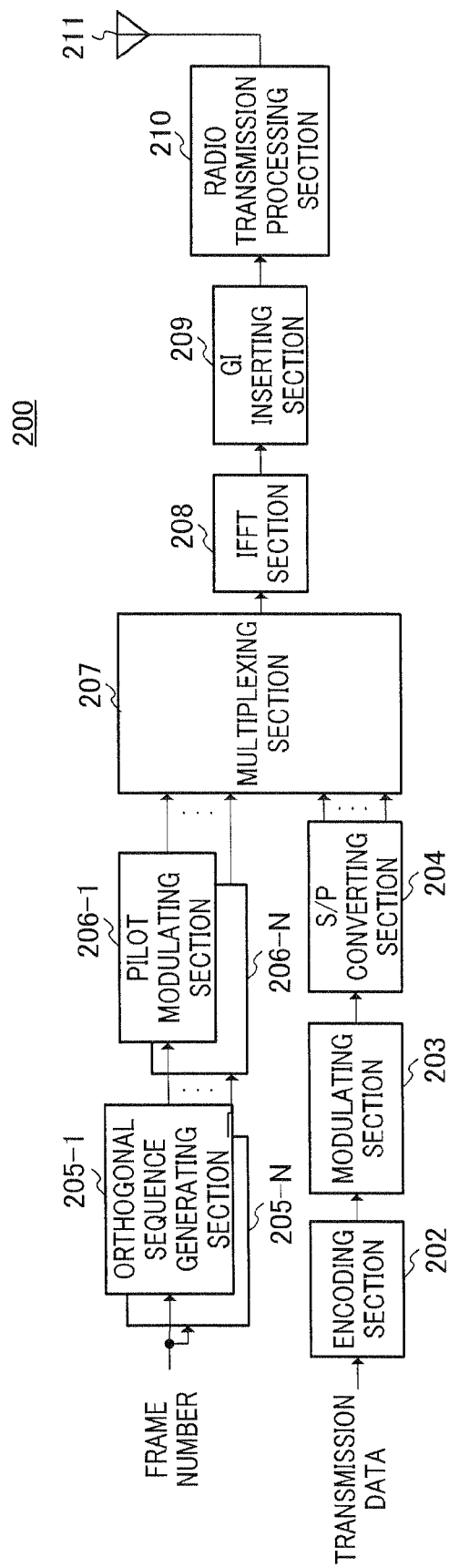
FIG. 9 is a block diagram showing a configuration of a base station apparatus according to Embodiment 2 of the present invention.

As shown in FIG. 9, BS200 has encoding section 202, modulating section 203, serial/parallel (S/P) converting section 204, orthogonal sequence generating sections 205-1 through 205-N, pilot modulating sections 206-1 through 206-N, multiplexing section 207, IFFT section 208, GI inserting section 209, radio transmission processing section 210 and antenna 211.

Encoding section 202 encodes transmission data (data addressed to MS#1 or MS#2). Modulating section 203 modulates the data encoded by encoding section 202. S/P converting section 204 converts the modulated signal from serial to parallel. The data converted from serial to parallel is outputted to multiplexing section 207.

Orthogonal sequence generating sections 205-1 through 205-N correspond to N subbands, respectively, which are obtained by dividing the entire communication band into N parts. Frame numbers are inputted to orthogonal sequence generating sections 205-1 through 205-N. Orthogonal sequence generating sections 205-1 through 205-N each generate a sequence that corresponds to a frame number. Two sequences generated for two consecutive frames have a specific orthogonal relationship. For example, the generated sequences are orthogonal between frames.

The sequences generated by orthogonal sequence generating sections 205-1 through 205-N are inputted to pilot modulating sections 206-1 through 206-N, respectively. Pilot modulating sections 206-1 through 206-N perform BPSK modulation on the inputted sequences, and thereby generates pilots that are orthogonal between frames. Specifically, pilots are generated so that the pilot generated for frame #1 and the pilot generated for frame #2 are orthogonal to each other. The generated pilots are outputted to multiplexing section 207.

Specifically, the configuration composed of the combination of orthogonal sequence generating sections 205-1 through 205-N and pilot modulating sections 206-1 through 206-N functions as a pilot generating section that generates pilots.

As described using FIG. 4 in Embodiment 1, the pilot generating sections make pilots orthogonal in a subband having a coherent bandwidth.

In the same way as in the example of FIG. 5 described in Embodiment 1, the pilot generating sections generate a pilot so that the pilot added to the data addressed to MS#1, and the pilot added to the data addressed to MS#2 are allocated to different times, that is, transmission timings. "Different times" mean that the intervals of corresponding frames from the start are different.

Alternatively, in the same way as in the example of FIG. 6 described in Embodiment 1, pilots are generated so that the pilot added to the data addressed to MS#1, and the pilot added to the data addressed to MS#2 are allocated to different frequencies.

Alternatively, in the same way as in the example of FIG. 7 described in Embodiment 1, the pilot generating sections may generate pilots so that the pilot added to the data addressed to MS#1, and the pilot added to the data addressed to MS#2 are allocated not only to different times, but also to different frequencies.

Multiplexing section 207 multiplexes the data inputted from S/P converting section 204 and the pilots inputted from pilot modulating sections 206-1 through 206-N, and generates a transmission signal (first transmission signal or second transmission signal). In other words, multiplexing section 207 has a function as an adding section that adds the pilot generated for a given frame to the data addressed to MS#1 to generate a first transmission signal, and adds the pilot generated for another frame to the data addressed to MS#2 to generate a second transmission signal.

IFFT section 208 performs IFFT processing on the transmission signal generated by multiplexing section 207. GI inserting section 209 inserts a GI in a predetermined position of the transmission signal after IFFT processing. Radio transmission processing section 210 performs predetermined radio transmission processing (such as D/A conversion and up-conversion, for example) on the transmission signal after GI insertion. The transmission signal after radio transmission processing is then transmitted from antenna 211 to RS or MS#2.

Figure 10:
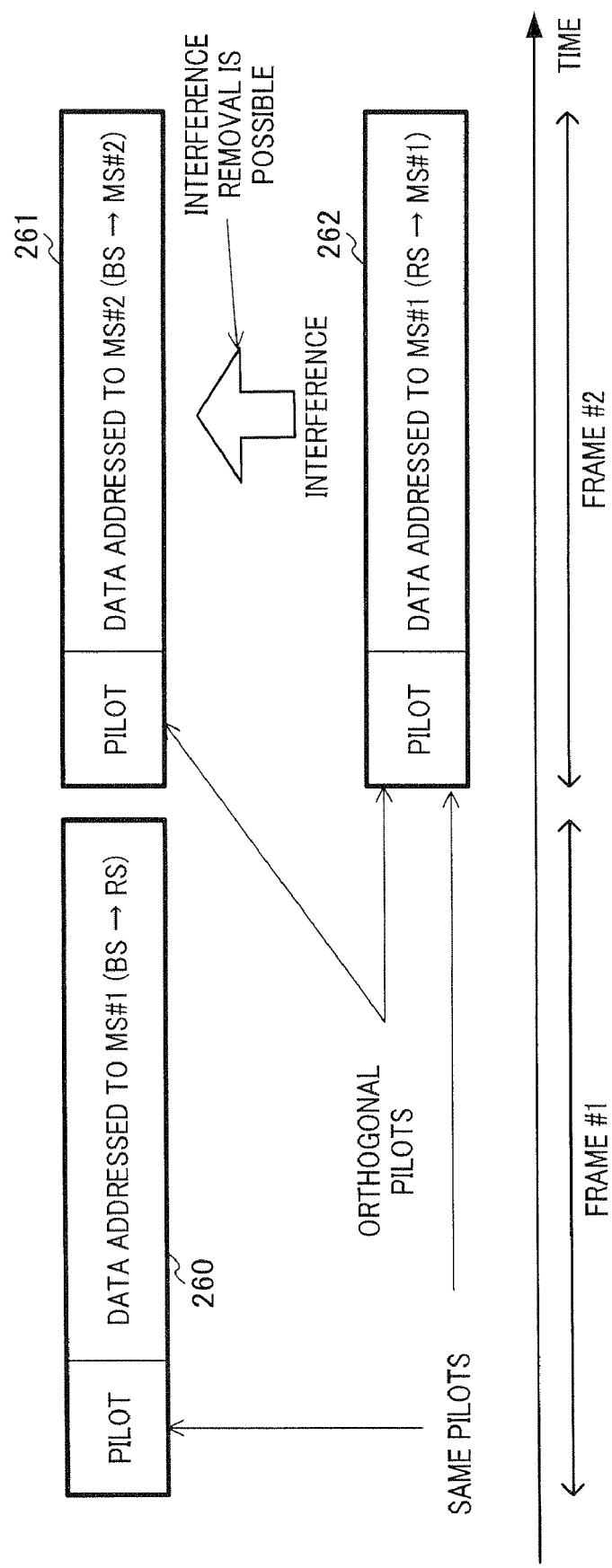
FIG. 10 illustrates an example of an operation of the mobile communication system according to Embodiment 2 of the present invention.

An example of the operation of the mobile communication system having the above configuration will next be described with reference to FIG. 10.

First, in frame #1, first transmission signal 260 is transmitted from BS200 to RS.

In frame #2, second transmission signal 261 is transmitted from BS200 to MS#2. The pilot added to the data addressed to MS#2 in second transmission signal 261 is orthogonal to the pilot added to the data addressed to MS#1 in first transmission signal 260.

In frame #2, relay signal 262 is transmitted from RS to MS#1. The pilot added to the data addressed to MS#1 in relay signal 262 is the same as the pilot added to the data addressed to MS#1 in first transmission signal 260.

Relay signal 262 transmitted from RS reaches MS#2 as an interference signal. However, the pilot added to the data addressed to MS#2 in second transmission signal 261 is orthogonal to the pilot added to the data addressed to MS#1 in relay signal 262. Therefore, MS#2 can remove the relay signal that arrives as an interference signal from the received radio signal by using a reception method that is capable of removing interference, such as MIMO reception, MMSE diversity reception and MMSE symbol combining reception, for example, and can extract only second transmission signal 261 transmitted from BS as a desired signal. In this case, the pilot used by BS200 is known by MS#2, and therefore it is not necessary to report the pilot used by RS to MS#2.

The pilots generated by BS will be described using FIG. 11. The generation of pilots that are orthogonal between frames will be described.

Figure 11:
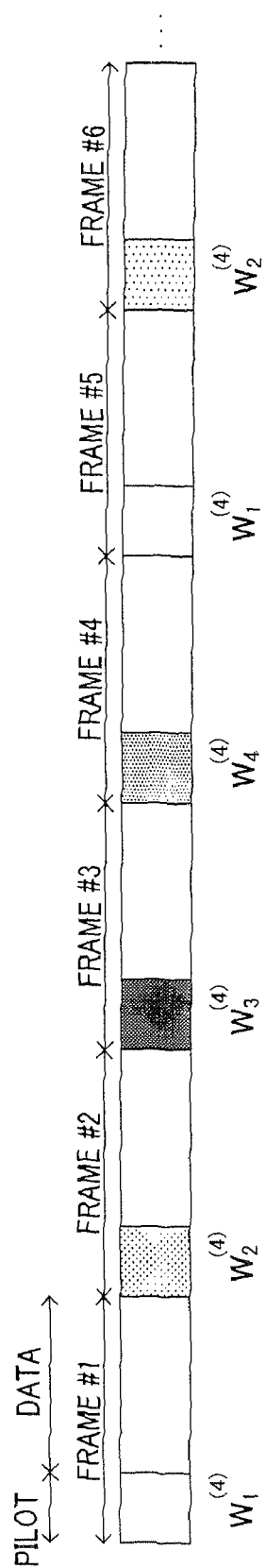
FIG. 11 shows an example of a pilot signal according to Embodiment 2 of the present invention.

In the example shown in FIG. 11, a Walsh sequence is used as a pilot sequence. $W_k^{(J)}$ indicates the kth sequence in the Walsh sequence having sequence length J. In this example, J=4. Pilots are generated using $W_1^{(4)}$ in frame #1, $W_2^{(4)}$ in frame #2, $W_3^{(4)}$ in frame #3, and $W_4^{(4)}$ in frame #4. In other words, an orthogonal sequence is used in a 4-frame cycle. In this arrangement, $W_1^{(4)}$ is (1, 1, 1, 1), $W_2^{(4)}$ is (1, -1, 1, -1), $W_3^{(4)}$ is (1, 1, -1, -1), and $W_4^{(4)}$ is (1, -1, -1, 1). The sequence used for frame #n is expressed by the following equation 1 as a general mathematical expression.

$$W_{(n-1) \bmod J+1}^{(J)}$$ (Equation 1)

When the signal received by RS in frame #1 is transmitted in frame #5, the pilot transmitted by BS200 in frame #5 is the same as the pilot transmitted by RS in frame #5. Generally, in RS, a processing delay of several frames may occur during relaying, but when the processing delay is four or more frames, the pilot transmitted by BS200 and the pilot transmitted by RS can be made orthogonal to each other by increasing sequence length J of the orthogonal sequence.

According to this embodiment, the relay signal can be removed by MS#2, so that it is possible to improve the reception error rate of MS#2 and improve the overall system throughput. Pilots are generated in BS200 so that the pilots transmitted from BS200 are made orthogonal between frames, and pilot substitution is not performed in RS, and therefore, it is not necessary to report to MS #2 in advance the pilots used by RS. Accordingly, it is possible to improve the overall system throughput compared to the mobile communication system described in Embodiment 1. Further, it is not necessary to manage allocation of pilots used by RS, so that it is possible to realize a simple mobile communication system.

Furthermore, interference can be removed using a MIMO receiver, which is assumed to be used in future high-transmission-rate mobile communication systems, so that it is possible to improve throughput without adding a complicated receiving circuit to the mobile station apparatus.

In addition, in this embodiment, the case has been described assuming radio communication in downlink. However, the present invention can be applied to uplink communication.

RS in this embodiment may also be provided to BS which is different from BS200, or to MS which is different from the above-described MS#1 and MS#2.

In this embodiment, only the pilot part in the signal transmitted from each apparatus is made orthogonal, but a configuration may also be employed where the data part is also made orthogonal.

The frame in which RS performs transmission has been described as frame #2 which follows frame #1, but the frame in which RS performs transmission does not necessarily follow frame #1, and may be a frame subsequent to frame #2, for example, frame #3, when a processing delay in RS is taken into consideration.

Further, the case has been described where OFDM is used as a transmission scheme, but this is by no means limiting, and, for example, other transmission schemes such as single-carrier transmission, CDMA, TDMA and FDMA may be used.

Further, the configuration has been described where RS transmits relay data after performing demodulating and decoding processing on the first transmission signal, but a signal before decoding or a signal before demodulation may be transmitted as relay data, for example.

In addition, the pilot signal may be referred to as a reference signal.

Furthermore, each function block used to explain the above-described embodiments is typically implemented as an LSI constituted by an integrated circuit. These may be individual chips or may partially or totally contained on a single chip.

Here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application in biotechnology is also possible.

The present application is based on the Japanese Patent Application No. 2005-042264, filed on Feb. 18, 2005, the entire content of which is expressly incorporated herein by reference.

INDUSTRIAL APPLICABILITY

The radio communication method, the relay station apparatus and the radio transmitting apparatus of the present invention may be used in a radio communication system where an apparatus for relaying a radio signal from a transmitting apparatus to a receiving apparatus is provided.

The invention claimed is:

1. A radio communication method used in a radio communication system including a transmitting apparatus, a relay station apparatus and a receiving apparatus, the radio communication method comprising:

a first transmission step of transmitting, from the transmitting apparatus to the relay station apparatus in a first transmission period, a first transmission signal that includes a signal addressed to the receiving apparatus; and a second transmission step of transmitting, from the transmitting apparatus in a second transmission period subsequent to the first transmission period, a second transmission signal that includes a first known signal, and simultaneously transmitting from the relay station apparatus a third transmission signal that includes the signal addressed to the receiving apparatus included in the first transmission signal, the third transmission signal further including a second known signal that has a specific orthogonal relationship with the first known signal.

2. The radio communication method according to claim 1, wherein:
in the first transmission step, a signal in which the first known signal is added to the signal addressed to the receiving apparatus, is transmitted as the first transmission signal; and
in the second transmission step, a signal in which the second known signal is substituted for the first known signal in the first transmission signal, is transmitted as the third transmission signal.

3. The radio communication method according to claim 1, wherein:
in the first transmission step, a signal in which the second known signal is added to a signal addressed to a first receiving apparatus, is transmitted as the first transmission signal; and
in the second transmission step, the first transmission signal is transmitted as the third transmission signal.

4. A relay station apparatus comprising:
a receiving section that receives a first transmission signal from a transmitting apparatus that transmits, in a first transmission period, a first transmission signal in which a first known signal is added to a signal addressed to a receiving apparatus, and transmits, in a second transmission period subsequent to the first transmission period, a second transmission signal that includes the first known signal;
a substituting section that substitutes a second known signal having a specific orthogonal relationship with the first known signal for the first known signal in the first transmission signal, and generates a third transmission signal; and
a transmitting section that transmits the third transmission signal to the receiving apparatus in the second transmission period.

5. The relay station apparatus according to claim 4, wherein:
the first known signal is generated using an orthogonal sequence; and
the relay station apparatus further comprises a generating section that modulates the orthogonal sequence used to generate the first known signal and generates the second known signal.

6. The relay station apparatus according to claim 5, wherein the generating section generates a second known signal that corresponds to any of a plurality of subbands.

7. The relay station apparatus according to claim 6, wherein the generating section generates a second known signal that corresponds to a first subband having a coherent bandwidth.

8. The relay station apparatus according to claim 4, wherein:
the first known signal is allocated to a first transmission timing; and
the relay station apparatus further comprises a generating section that generates a second known signal allocated at a second transmission timing which is different from the first transmission timing.

9. The relay station apparatus according to claim 4, wherein:
the first known signal is allocated to a first frequency; and
the relay station apparatus further comprises a generating section that generates a second known signal allocated to a second frequency which is different from the first frequency.

10. A radio transmitting apparatus comprising:
an adding section that adds a first known signal to a signal addressed to a receiving apparatus to generate a first transmission signal, and generates a second transmission signal that includes a second known signal having a specific orthogonal relationship with the first known signal; and
a transmitting section that transmits the first transmission signal in a first transmission period, and transmits the second transmission signal in a second transmission period to a relay station apparatus that transmits the first transmission signal to the receiving apparatus in the second transmission period subsequent to the first transmission period.

11. The radio transmitting apparatus according to claim 10, further comprising a generating section that modulates a predetermined orthogonal sequence and generates the first known signal and the second known signal.

12. The radio transmitting apparatus according to claim 11, wherein the generating section generates a first known signal and a second known signal that correspond to any of a plurality of subbands.

13. The radio transmitting apparatus according to claim 12, wherein the radio transmitting apparatus generates a first known signal and a second known signal that correspond to a subband having a coherent bandwidth.

14. The radio transmitting apparatus according to claim 10, further comprising a generating section that generates a first known signal allocated to a first transmission timing, and a second known signal allocated to a second transmission timing which is different from the first transmission timing.

15. The radio transmitting apparatus according to claim 10, further comprising a generating section that generates a first known signal allocated to a first frequency, and a second known signal allocated to a second frequency which is different from the first frequency.

* * * * *